United States Patent
Rodrigo et al.

(10) Patent No.: US 7,539,139 B2
(45) Date of Patent: May 26, 2009

(54) METHOD FOR TRANSMISSION OF DATA PACKETS THROUGH A NETWORK WITH AN AGGREGATION STRATEGY WITH TIMEOUT TO A BURST

(75) Inventors: Miguel De Vega Rodrigo, Brussels (BE); Robert Pleich, München (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 640 days.

(21) Appl. No.: 10/570,006

(22) PCT Filed: Aug. 18, 2004

(86) PCT No.: PCT/EP2004/051827
§ 371 (c)(1),
(2), (4) Date: Feb. 28, 2006

(87) PCT Pub. No.: WO2005/022843
PCT Pub. Date: Mar. 10, 2008

(65) Prior Publication Data
US 2007/0064729 A1    Mar. 22, 2007

(30) Foreign Application Priority Data
Aug. 28, 2003  (EP)  .................. 03019473

(51) Int. Cl.
*H04L 12/28* (2006.01)
*H04L 12/56* (2006.01)

(52) U.S. Cl. .................. 370/235; 370/477; 370/395.41
(58) Field of Classification Search ............ 375/E7.001, 375/E7.026, E7.126, E7.132; 370/254, 255, 370/229, 235
See application file for complete search history.

(56) References Cited

OTHER PUBLICATIONS

Jolyon White, Mosche Zukermann, Hai Le Vu, "A Framework for Optical Burst Switching Network Design", IEEE Service Center Communications Letters, Jun. 2002, pp. 268-270, vol. 6, No. 6, Piscataway, US, XP001133264.
Michael Düser and Polina Bayvel, "Analysis of a Dynamically Wavelength-Routed Optical Burst Switched Network Architecture", Journal of Lightwave Technology, Apr. 2002, pp. 574-585, IEEE, vol. 20, No. 4, New York, US, XP01130015.

*Primary Examiner*—Pankaj Kumar
*Assistant Examiner*—Fan Ng
(74) *Attorney, Agent, or Firm*—Dickinson Wright, PLLC; Kevin R. Spivak

(57) ABSTRACT

A method for transmission of data packets through a network is provided. The data packets with a maximum allowable delay are aggregated in a node of the network according to an aggregation strategy with timeout to a burst, wherein on arrival and buffering of a first packet a timer is started and succeeding packets are buffered until a time is elapsed, the buffered packets are sent as a burst into the network and with the next arriving and buffered packet the timer respectively this cycle is started again, where the time is determined by the product of the maximum allowable delay for a packet multiplied with the value 2.

9 Claims, 1 Drawing Sheet

METHOD FOR TRANSMISSION OF DATA PACKETS THROUGH A NETWORK WITH AN AGGREGATION STRATEGY WITH TIMEOUT TO A BURST

CROSS REFERENCE TO RELATED APPLICATIONS

This application is the US National Stage of International Application No. PCT/EP2004/051827, filed Aug. 18, 2004 and claims the benefit thereof. The International Application claims the benefits of European application No. 03019473.2 EP filed Aug. 28, 2003, both of the applications are incorporated by reference herein in their entirety.

FIELD OF INVENTION

The present invention relates to a method for the transmission of data packets through a communications network.

BACKGROUND OF INVENTION

In networks, like Optical Burst-Switched (OBS) networks or optical networks, packets, e.g. Internet Protocol (IP) packets, Asynchrony Transfer Mode (ATM) cells or protocol data units (PDUs), are aggregated to bursts, like electrical or optical bursts, in order to be transferred through the network. The conversion of packets into bursts takes place in a node, like an edge node, of the network according to a certain aggregation strategy. The solutions so far provide two main aggregation strategies: the aggregation strategy with timeout and the aggregation strategy with buffer limit. We will concentrate on the aggregation strategy with timeout. A schematic example is shown in FIG. 1. In this scheme, packets 102 are added or aggregated to a burst 104 which is being generated in a buffer 106 until a certain time T of a timer expires. Then the aggregated packets are sent as a burst 108 into the network. After sending of the burst the buffer is empty. The next arriving and stored packet starts the timer again with the aggregation time T and arriving packets are stored again in the buffer 106, until the time T expires. Then the burst is sent and the cycle starts again.

Once the packets are transformed into bursts and sent into the network, they travel in the network through a series of switches, like electrical or optical switches, depending on the network, to a certain destination. At best, these switches have limited storage capabilities, e.g. in case of optical switches fiber delay lines, and at worst, no storage capabilities at all in the normal case. Therefore, collisions among bursts occur. In a switch are two possible causes for the blocking of a burst.

First there is blocking due to switching time. A switch needs a certain time in order to process the header of an incoming burst and to prepare the switching elements so that the burst will be sent to the adequate output and channel, in case of optical switches to the corresponding fiber and wavelength. This switching time is technology dependent. The blocking due to switching time occurs when a burst comes before the switching time is elapsed.

Second there is blocking due to burst overlapping. In general, a switch has a limited number of m channels per connection or per port, in case of optical switches m wavelengths per optical fiber, going to a certain destination. A burst is blocked when on a certain outgoing connection all the m channels are busy, e.g. on a fiber all the m wavelengths are busy.

On the other hand the burst generation time at the nodes is the main cause for the delay that a packet experiences. The burst generation time is the time that a packet has to wait in the buffer at the node until the burst to which it belongs is completely generated.

SUMMARY OF INVENTION

Major performance parameters of a network are the burst blocking probability, the throughput and the delay.

It is an object of the invention to determine the time T for the timeout for a given maximum allowable delay of a packet.

This object is achieved by the features recited in the claims.

The invention has the advantage, that an optimum range of the time T for the timeout timer is given. This leads to a reliable throughput in the network.

By using of the double maximum allowable delay mad for the time T, a maximum multiplexing gain is achieved. Also the condition of the maximum allowable delay is satisfied.

Further developments of the invention are identified in the dependent claims.

The inventor found out, that for the transmission of data packets through a network, where said packets with a maximum allowable delay mad, an average packet rate apr and an average packet size aps are aggregated in a node of the network according to an aggregation strategy with timeout to a burst and said burst is transmitted through at least one switch of the network, with a number of channels noc, a switching time $t_s$ and a given burst blocking probability bbp, the optimum time T is between an upper and a lower limit.

The upper limit $T_u$ is determined by plus/minus ten percent of the product of the maximum allowable delay mad for a packet multiplied with the value two.

$$T_u = mad \cdot 2 \qquad \text{Equation 1}$$

The lower limit $T_l$ is determined by plus/minus ten percent of a quotient, where the dividend consists of three terms, where the first is the switching time $t_s$, the second term is a quotient, which is the result of a inverse Erlang B formula for the number of channels noc and the burst blocking probability bbp divided by the average packet rate apr, and the third term is another quotient, which is the average packet size aps divided by the link speed ls, where the first term is subtracted by the second term and added to the third term, and the quotient is a second difference, where the minuend is the result of a inverse Erlang B formula for the number of channels noc and the burst blocking probability bbp and the subtrahend is a quotient, where the dividend is the product of the average packet rate apr and average packet size aps and the divisor is the link speed ls.

$$T_l = \frac{t_s - \frac{E_{noc}^{-1}(bbp)}{apr} + \frac{aps}{ls}}{E_{noc}^{-1}(bbp) - \frac{apr \cdot aps}{ls}} \qquad \text{Equation 2}$$

where $E_{noc}^{-1}(bbp)$ respectively $E_m^{-1}(x)$ is the inverse Erlang B formula for m channels, in case of OBS networks wavelengths, and for a load of x.

Beyond, for a given maximum allowable delay mad for an incoming packet the time T of the timeout should be for an optimum two times of the maximum allowable delay mad. It can be smaller than the double time, so the time T is determined by the maximum allowable delay mad for a packet multiplied with a constant k, which should be in minimum 0.75 and in maximum 2. A preferred value of 2 should be used.

$$T = mad \cdot k \qquad \text{Equation 3}$$

The multiplexing gain increases, if the constant k is chosen closer to 2.

The average packet size aps can be ascertained by measuring the size of the incoming packets and determine the average packet size aps. In case the incoming packets are IP packets, the results of the so called tri modal distribution for IP packets can be used. According to this distribution the average packet size aps of an IP packet is 3735 bits per IP packet.

BRIEF DESCRIPTION OF THE DRAWINGS

An exemplary embodiment of the invention is described in greater detail below with reference to a drawing.

Shown in the drawing are.

DETAILED DESCRIPTION OF INVENTION

Figure 1:
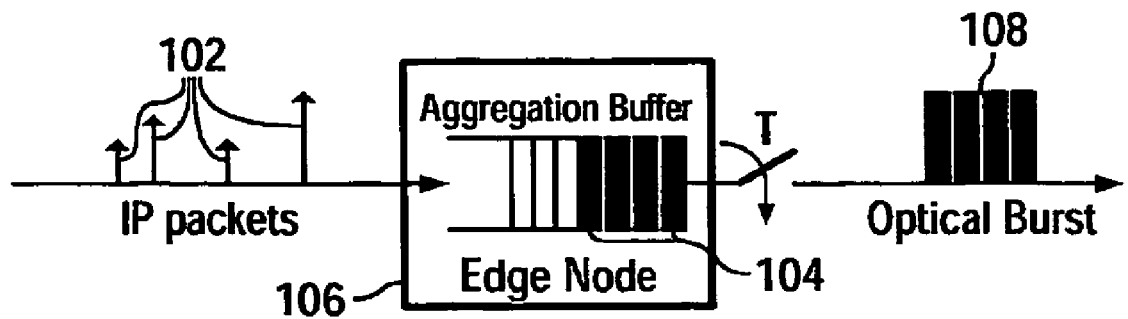
FIG. 1 the initially cited prior art, according to an aggregation strategy with timeout.
Figure 2:
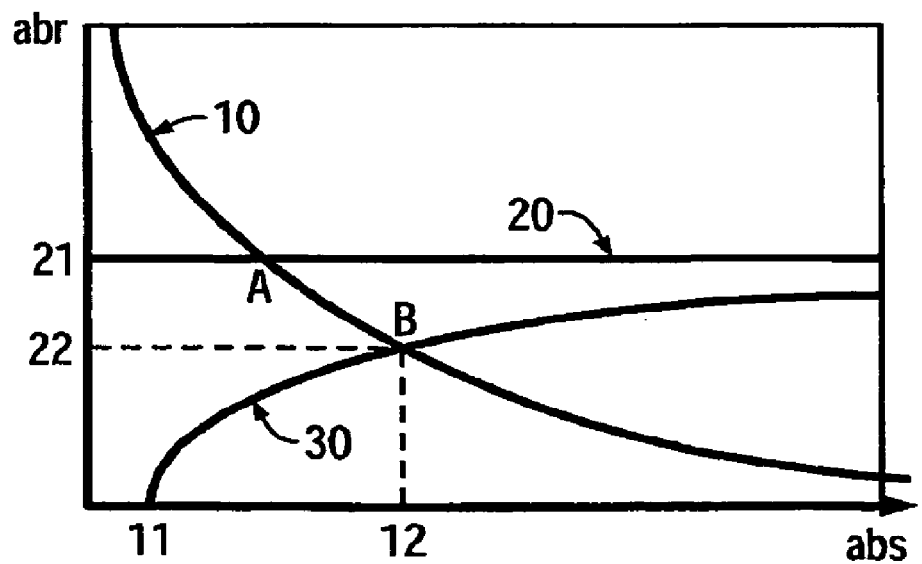
FIG. 2 a diagram with the average burst rate as a function of the average burst size.

FIG. 2 shows a diagram with three curves 10, 20, 30. On the x-axis the average burst size abs and on the y-axis the average burst rate abr is shown. Values 11 and 12 for two average burst sizes are shown on the x-axis and two values 21 and 22 for an average burst rate are shown on the y-axis. The first curve 10 is a throughput curve and displays a dependency between the average burst size and the average burst rate for a given, constant throughput TP, according the following formula:

$$TP = abr \cdot abs \qquad \text{Equation 4}$$

The throughput of the optical bursts is constant and known. The reason is that the edge node neither generates nor loses information, which means that the throughput of the incoming data packets has to be equal to the throughput of the outgoing bursts. Since the throughput of the incoming data packets is assumed to be known and constant at the time the optimum is calculated, the optimal average burst rate abr and average burst size abs have to lead us to the same constant throughput TP.

When we move on the throughput curve to the left (smaller bursts and higher rates) the burst blocking probability increases. The frequency of bursts is higher, and therefore it is more probable that the switching time guard is not respected. The value 21 with the curve 20 imposes a maximum average burst rate for a given burst blocking probability. This leads two a maximum average burst rate and an average burst size according to the throughput curve, represented by a point A in FIG. 2.

When we move on the throughput curve to the right (bigger bursts and lower rate) the delay increases. The bursts are bigger and therefore a data packet has to wait in average longer until the burst to which it belongs is finished. The dependency of the average burst size and the average burst rate for a given maximum allowable delay of a packet is shown by curve 30 in FIG. 2. Concerning the throughput curve 10, for a given throughput and a given maximum allowable delay the maximum average burst size and minimum average burst rate is represented by a point B in FIG. 2.

In FIG. 2, the whole segment AB fulfills the condition of maximum allowable delay and given burst blocking probability. However, due to the fact that point B represents bigger burst sizes, this point B is better that any other point of the segment AB in the sense that it leads to a higher multiplexing gain. For this reason, the desired optimum should be chosen near to the point B.

According to this, the above mentioned formulas determine an optimum time T for the timeout strategy. Using two times of the maximum allowable delay mad, the optimum in point B is chosen.

For an edge node of an Optical Burst Switched (OBS) network, wherein on the edge node incoming packets are aggregated to bursts, which are sent as optical bursts into the OBS network with a number of optical switches, the timeout time T will be determined by an example.

An edge node receives traffic, e.g. IP packets from a STM-1 link with a link speed ls of 155.52 Mbits/s. The average load al of the link may be 0.7. A tri modal distribution of the IP packets with an average IP packet size aps of 3735 bits/packet is assumed. This leads to an average packet rate apr of 29246.988 packets/s. The average maximum allowable delay mad of an IP packet in the edge node should be below 0.002 s. An OBS system with an optical switch receives traffic from this edge node. The switching time $t_s$ in the optical switch is 10 µs and there are 8 channels (wavelengths) available per fiber. Assume that we wish to have a burst blocking probability bbp in the switch below $10^{-6}$.

We get an optimum value for the timeout time T:

$$T = 2 \cdot mad = 2 \cdot 0.002 \ s = 4 \ ms$$

This value respectively plus/minus ten percent of this value defines the upper limit for the timeout time T. This is the preferred optimum value for the timer T.

Using the inverse Erlang B formula for the number of channels noc and a blocking probability bbp of $10^{-6}$ we obtain:

$$E_8^{-1}(10^{-6}) = 0.7337 \ \text{erlang}.$$

We get the lower limit for the timeout time T:

$$T_l = \frac{t_s - \frac{E_{noc}^{-1}(bbp)}{apr} + \frac{aps}{ls}}{E_{noc}^{-1}(bbp) - \frac{apr \cdot aps}{ls}} =$$

$$\frac{10 \mu s - \frac{0{,}7337 \ erl}{29146.988 \ pack/s} + \frac{3735 \ \text{bits/pack}}{155{,}52 \ \text{Mbit/s}}}{0{,}7337 \ erl - \frac{29146.988 \ pack/s \cdot 3735 \ \text{bits/pack}}{155{,}52 \ \text{Mbit/s}}} = 0{,}26 \ ms$$

This value respectively plus/minus ten percent of this value defines the lower limit for the timeout time T.

If the time T falls below the lower limit, the blocking probability increases and the desired value of $10^{-6}$ is violated.

It shall be appreciated that advantages of the invention are:

A throughput is reliable achieved.

A given maximum allowable delay is satisfied.

A given blocking probability is satisfied.

The invention claimed is:

1. A method for transmitting data packets through a communications network, the data packets having a maximum allowable delay (mad), an average packet rate (apr), and an average packet size (aps) that are aggregated in a communications network node of the network in accordance with an aggregation strategy with timeout to a burst, the method comprising:

buffering a first packet and subsequent packets until a first time has elapsed; and transmitting the buffered packets as a burst into the network, wherein the burst is transmitted via at least one switch of the network, with a number of channels (noc), a switching time ($t_S$), and a burst blocking probability (bbp), wherein the first time is between an upper and lower limit, wherein the upper limit ($T_u$) is determined by the formula:

$T_u = 110\% \, (mad*2)$, wherein the lower limit ($T_l$) is determined by the formula $$T_l = 90\% \times \frac{t_s - \frac{E_{noc}^{-1}(bbp)}{apr} + \frac{aps}{ls}}{E_{noc}^{-1}(bbp) - \frac{apr \cdot aps}{ls}}$$

where $E_{noc}^{-1}$ is an inverse Erlang B formula for the noc and bbp, and where ls is a link speed.

2. The method according to claim 1, wherein the upper limit is between 110% (mad*2) and 90% (mad*2).

3. The method according to claim 1, wherein the lower limit is between $$T_l = 90\% \times \frac{t_s - \frac{E_{noc}^{-1}(bbp)}{apr} + \frac{aps}{ls}}{E_{noc}^{-1}(bbp) - \frac{apr \cdot aps}{ls}} \text{ and}$$

$$T_l = 110\% \times \frac{t_s - \frac{E_{noc}^{-1}(bbp)}{apr} + \frac{aps}{ls}}{E_{noc}^{-1}(bbp) - \frac{apr \cdot aps}{ls}}.$$

4. The method according to claim 1, wherein the packets are Internet Protocol (IP) packets.

5. The method according to claim 4, wherein the network is formed as an Optical Burst Switch network.

6. The method according to claim 5, wherein the node is an edge node of the network.

7. The method according to claim 6, wherein the burst is transformed in the edge node and sent as an optical burst.

8. The method according to claim 1, wherein the network is formed as an Optical Burst Switch network.

9. The method according to claim 1, wherein the node is an edge node of the network.

* * * * *